(12) United States Patent
Nishimoto et al.

(10) Patent No.: US 7,650,872 B2
(45) Date of Patent: Jan. 26, 2010

(54) INTERNAL COMBUSTION ENGINE

(75) Inventors: Toshiaki Nishimoto, Hiroshima (JP);
Masahisa Yamakawa, Hiroshima (JP);
Takashi Youso, Hiroshima (JP); Tatsuya Fujikawa, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 12/347,705

(22) Filed: Dec. 31, 2008

(65) Prior Publication Data

US 2009/0173312 A1    Jul. 9, 2009

(30) Foreign Application Priority Data

Jan. 8, 2008    (JP) .............................. 2008-001622

(51) Int. Cl.
*F02F 3/26* (2006.01)
(52) U.S. Cl. .................. 123/279; 123/298; 123/307; 123/193.6
(58) Field of Classification Search .................. 123/279, 123/285, 298, 307, 196.3
See application file for complete search history.

(56) References Cited

U.S. PATENT DOCUMENTS

| | | | |
|---|---|---|---|
| 5,862,789 A * | 1/1999 | Chaouche et al. ............ | 123/279 |
| 6,129,070 A * | 10/2000 | Jingu et al. ................. | 123/298 |
| 6,152,103 A * | 11/2000 | Kudo et al. ................. | 123/298 |
| 6,161,518 A * | 12/2000 | Nakakita et al. ............ | 123/298 |
| 6,378,486 B1 * | 4/2002 | Spiegel et al. ............... | 123/298 |
| 6,453,872 B1 * | 9/2002 | Miyajima et al. ........... | 123/298 |
| 6,502,540 B1 * | 1/2003 | Smith .......................... | 123/295 |
| 6,637,402 B2 * | 10/2003 | Liu ............................... | 123/279 |
| 6,640,772 B2 * | 11/2003 | Gatellier et al. ............. | 123/298 |
| 6,675,767 B2 * | 1/2004 | Gatellier et al. ............. | 123/298 |
| 6,691,670 B1 * | 2/2004 | Gatellier et al. ............. | 123/298 |
| 6,705,279 B2 * | 3/2004 | Iriya ............................ | 123/301 |
| 6,732,702 B2 * | 5/2004 | Liu et al. ...................... | 123/279 |
| 6,892,695 B2 * | 5/2005 | Schmitz et al. .............. | 123/295 |
| 6,966,294 B2 * | 11/2005 | Eckerle et al. ............... | 123/298 |
| 6,997,158 B1 * | 2/2006 | Liu .............................. | 123/279 |
| 7,096,848 B2 * | 8/2006 | Ono et al. .................... | 123/294 |
| 7,210,448 B2 * | 5/2007 | Stanton et al. ............... | 123/298 |

(Continued)

FOREIGN PATENT DOCUMENTS

JP    2007154827 A    6/2007

*Primary Examiner*—Hai H Huynh
(74) *Attorney, Agent, or Firm*—Studebaker & Brackett PC; Donald R. Studebaker (57) ABSTRACT

Disclosed is an internal combustion engine, which has a geometric compression ratio of 13.0 or greater, and a combustion chamber (4) configured to satisfy a condition of $S/V2 \leqq 0.12$ (mm$^{-1}$) when a radius r of a hypothetical sphere (IS) with its center at an ignition point (CP) of a spark plug (3) is set to satisfy a condition of $V2=0.15 \times V1$, where: S (mm$^2$) is an area of an interference surface between the hypothetical sphere (IS) and an inner wall of the combustion chamber (4) in a state when a piston (30) is at its top dead center position; V1 (mm$^3$) is a volume of the combustion chamber 4 in the state when the piston (30) is at the top dead center position; and V2 (mm$^3$) is a volume of a non-interference part of the hypothetical sphere (IS) which is free of interference with the inner wall of the combustion chamber (4) when the piston (30) is at the top dead center position. The internal combustion engine of the present invention can more reliably improve fuel economy.

17 Claims, 7 Drawing Sheets

U.S. PATENT DOCUMENTS 7,213,564 B2 * 5/2007 Hill et al. .................... 123/298
7,441,535 B2 * 10/2008 Yuzaki et al. ............... 123/276
7,441,536 B2 * 10/2008 Bertsch ...................... 123/298
7,506,631 B2 * 3/2009 Altenschmidt et al. ...... 123/298

* cited by examiner

INTERNAL COMBUSTION ENGINE

BACKGROUND OF THE INVENTION

1. Field of the Invention

The present invention relates to a reciprocating internal combustion engine, and particularly to a reciprocating internal combustion engine having a geometric compression ratio of 13.0 or greater.

2. Description of the Background Art

In a reciprocating internal combustion engine, a technique intended to improve flame propagation characteristics based on a configuration of a combustion chamber has been proposed. For example, JP 2007-154827A proposes a technique of forming a spherical-shaped cavity on a top surface of a piston so as to uniformize flame propagation to improve combustion efficiency.

Further, as means for improving fuel economy, a technique of setting a geometric compression ratio at a higher value to improve thermal efficiency has been proposed. However, if the geometric compression ratio is simply set at a higher value, there arise problems that no improvement in fuel economy can be obtained in some cases, and knocking is more likely to occur.

It is considered that one of the causes of the problems roots in flame propagation characteristics. Specifically, given that an engine displacement is constant, as the geometric compression ratio is set at a higher value, a volume of a combustion chamber becomes smaller, and thereby a flame comes into interference with an inner wall defining the combustion chamber, such as a top surface of a piston, at an earlier timing to cause deterioration in thermal efficiency due to cooling loss resulting from the interference, and occurrence of abnormal combustion. In order to improve flame propagation characteristics, it is contemplated to provide a cavity on a top surface of a piston, as disclosed in the above patent publication. However, if such a cavity is simply provided, the geometric compression ratio will become smaller, resulting in insufficient improvement in fuel economy.

SUMMARY OF THE INVENTION

It is therefore an object of the present invention to provide an internal combustion engine capable of more reliably improving fuel economy.

In order to achieve this object, the present invention provides an internal combustion engine comprising a cylinder, a piston which reciprocates within the cylinder, a cylinder head which defines a combustion chamber in cooperation with the cylinder and piston, and a spark plug which is provided in the cylinder head, wherein the engine has a geometric compression ratio of 13.0 or greater, and the combustion chamber is configured to satisfy a condition of $S/V2 \leq 0.12$ (mm$^{-1}$) when a radius r of a hypothetical sphere with its center at an ignition point of the spark plug is set to satisfy a condition of $V2 = 0.15 \times V1$, where: $S$ (mm$^2$) is an area of an interference surface between the hypothetical sphere and an inner wall of the combustion chamber in a state when the piston is at its top dead center position; $V1$ (mm$^3$) is a volume of the combustion chamber in the state when the piston is at the top dead center position; and $V2$ (mm$^3$) is a volume of a non-interference part of the hypothetical sphere which is free of interference with the inner wall of the combustion chamber when the piston is at the top dead center position.

DESCRIPTION OF THE PREFERRED EMBODIMENTS

Figure 1A:
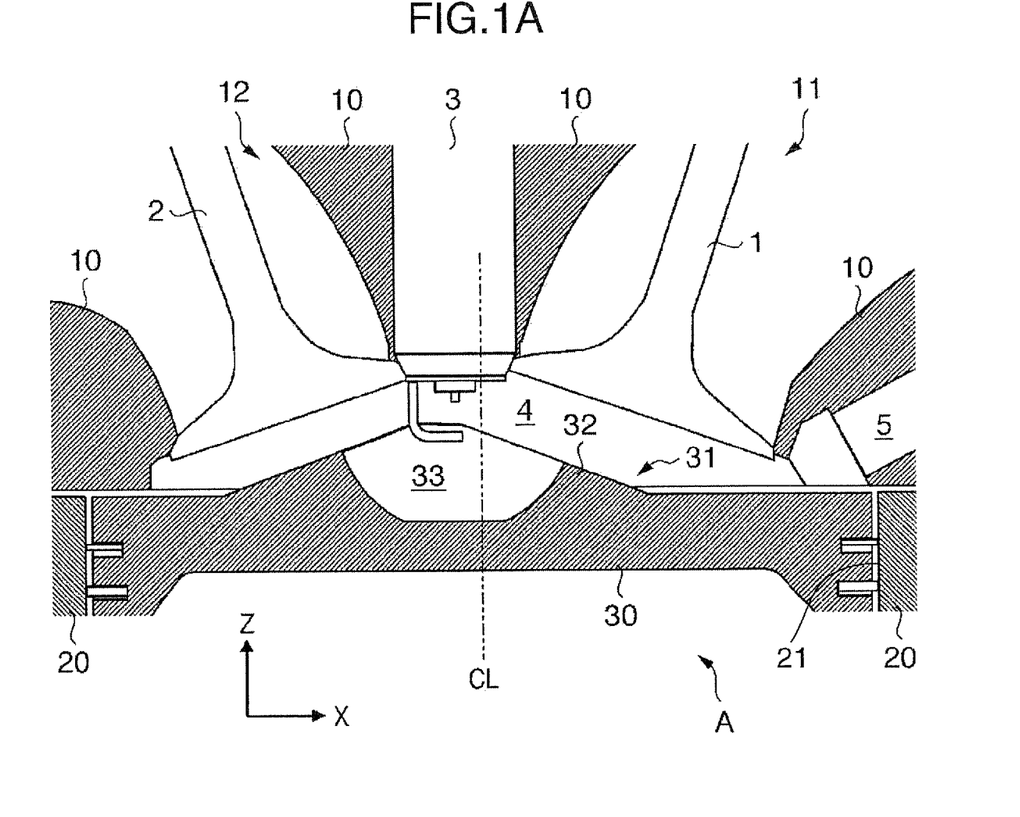
FIG. 1A is a partially vertical sectional view showing a structure around a combustion chamber 4 of an internal combustion engine A according to one embodiment of the present invention.
Figure 1B:
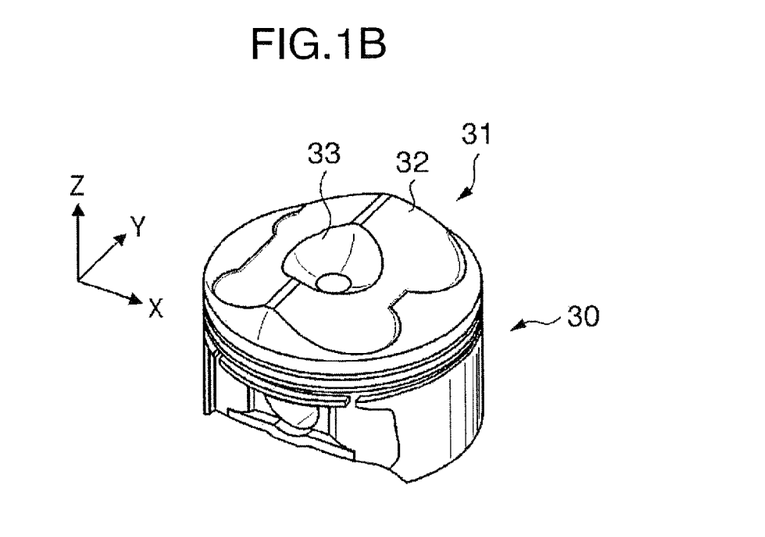
FIG. 1B is a fragmentary perspective view showing a piston 30 of the engine A.

FIG. 1A is a partially vertical sectional view showing a structure around a combustion chamber 4 of an internal combustion engine A according to one embodiment of the present invention, and FIG. 1B is a fragmentary perspective view showing a piston 30 of the engine A. Although the engine A is designed to aim at a four-cycle inline multicylinder gasoline engine, the present invention can also be applied to other types of spark-ignited reciprocating engines. In FIGS. 1A and 1B, Z, Y and X indicate a direction of a linear reciprocating movement of the piston 30, a cylinder arrangement direction, and a direction perpendicular to the cylinder arrangement direction, respectively, wherein a respective two of the Z, Y and X directions intersect with each other at a right angle. CL indicates a central axis of the piston 30 which extends in the same direction as the Z direction.

The engine A comprises a cylinder head 10. The cylinder head 10 has, per cylinder, two pairs of intake and exhaust ports 11, 12 (only one of the pairs being shown in FIG. 1A). Two intake valves 1 are provided in respective ones of the intake ports 11, and two exhaust valves 2 are provided in respective ones of the exhaust ports 12, in such a manner to open and close those ports 11, 12 according to an action of a valve operating mechanism provided, but not shown, in the cylinder head 10. The cylinder head 10 is concaved in the Z direction in a region defining the combustion chamber 4, and provided with a spark plug 3 at a position around a center of the concaved region. The spark plug 3 is operable to create a spark so as to ignite an air/fuel mixture to cause combustion of the mixture to be initiated. In this embodiment, the intake valve 1, the spark plug 3 and the exhaust valve 3 are arranged in this order in a direction perpendicular to the central axis CL of the piston 30 (specifically, in the X direction).

The cylinder head 10 is also provided with an injector 5 operable to inject fuel into the combustion chamber 4. Although the engine A according to this embodiment is designed to aim at a so-called "direct injection type", the present invention can also be applied to a port injection-type reciprocating engine.

The engine A further comprises a cylinder block 20. The piston 30 is disposed within each of a plurality of cylinders 21 of the cylinder block 20, and adapted to reciprocate in the Z direction according to combustion of an air/fuel mixture in the combustion chamber 4. A linear reciprocating movement of the piston 30 will be converted to a rotational movement of a crankshaft (not shown).

The piston 30 has a top surface 31 with a raised portion 32 which protrudes upwardly in the Z direction. Based on providing the raised portion 32, a geometric compression ratio of the engine A can be set at a higher value. In this embodiment, the region of the cylinder head 10 defining the combustion chamber 4 is concaved in the Z direction, as mentioned above. More specifically, the cylinder head 10 is concaved at a position corresponding to a center of the combustion chamber 4 to a greater depth than at a position where each of the intake valve 1 and the exhaust valve 2 is provided. In conformity to this configuration of the cylinder head 10, the raised portion 32 is formed to gradually protrude upwardly from a lateral part of the piston 30 located under each of the intake valve 1 and the exhaust valve 2 toward a center of the piston 30. Based on forming the raised portion 32 in this manner, a thickness of the combustion chamber 4 in the Z direction can be uniformized to prevent significant deterioration in flame propagation characteristics.

Figure 2:
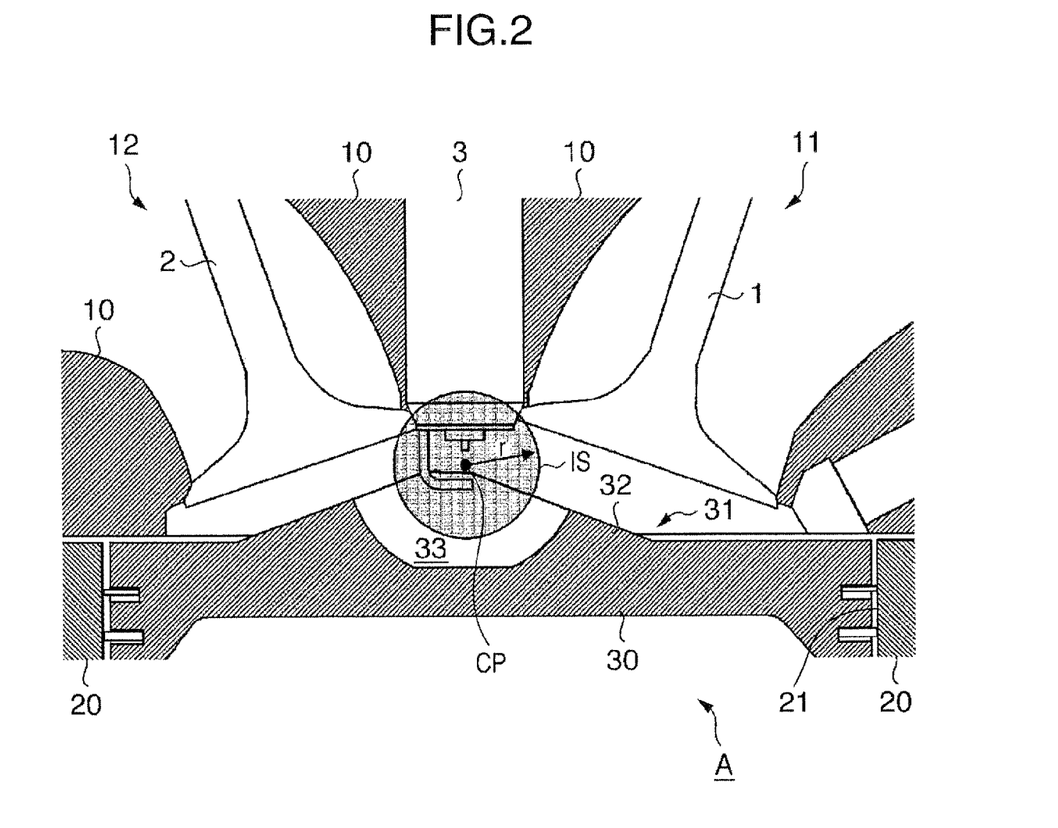
FIG. 2 is an explanatory diagram of a hypothetical sphere IS.

The top surface 31 of the piston 30 also has a cavity 33. Based on providing the cavity 33, a flame propagation in the Z direction which is the movement direction of the piston 30, i.e., a flame propagation directed downwardly from the spark plug 3, can be promoted to improve engine thermal efficiency. In this embodiment, the cavity 33 is arranged under an ignition point CP (see FIG. 2) of spark ignition by the spark plug 3. The ignition point CP means a middle position of an inter-electrode gap (spark gap) in a distal end of the spark plug 3, as shown in FIG. 2. Based on arranging the cavity 33 of the piston 30 under the ignition point CP, the flame propagation characteristics can be further improved to facilitate improvement in thermal efficiency of the engine A. Although the cavity 33 in this embodiment is formed in a bowl shape, the cavity 33 is not limited to a specific shape.

In this embodiment, the geometric compression ratio is set at 13.0 or greater. Based on setting the geometric compression ratio at a higher value, the thermal efficiency can be improved to facilitate improvement in fuel economy. As is well known, the geometric compression ratio is expressed as (V0+V1)/V1, wherein V1 is a volume of the combustion chamber 4 in a state when the piston 30 is at its top dead center position, and V0 is an engine displacement (stroke volume).

The volume V1 is a so-called "clearance volume", which is a volume of the combustion chamber 4 defined by an inner wall of the cylinder head 10 facing the combustion chamber 4, a surface of a component (the intake and exhaust valves 1, 2 (in their closed state), the spark plug 3 and the injector 5) attached to the cylinder head 10, an inner wall of the cylinder 21 of the cylinder block 20, a surface of the piston 30, and a clearance between the cylinder head 10 and the cylinder block 20, in the state when the piston 30 is at the top dead center position. In this embodiment, a unit of cubic millimeter ($mm^3$) is used for the volume V1. Further, the above portions defining the combustion chamber 4 will be referred to collectively as "inner wall of the combustion chamber" or "combustion chamber-defining inner wall".

It is expected that the thermal efficiency is improved to facilitate improvement in fuel economy, by setting the geometric compression ratio at a higher value. However, if the geometric compression ratio is simply set at a higher value, no improvement in fuel economy can be obtained in some cases. The reason would be that, as the geometric compression ratio is set at a higher value, the volume V1 becomes relatively smaller under a condition of a constant engine displacement, and thereby a flame comes into interference with the combustion chamber-defining inner wall at an earlier timing to cause deterioration in flame propagation. Therefore, it is essential for achieving efficient engine design to clarify a cause-and-effect relationship between improvement in fuel economy and flame propagation characteristics.

In this embodiment, a hypothetical sphere IS as shown in FIG. 2 is firstly set out. FIG. 2 is an explanatory diagram of the hypothetical sphere IS. The hypothetical sphere IS is a sphere having a radius r from its center at the ignition point CP. The hypothetical sphere IS has a configuration obtained by geometrically modeling a flame propagation range on an assumption that a flame is propagated in a radial pattern. The radius r indicates a stage of progress of flame propagation. Specifically, a hypothetical sphere IS having a relatively small radius r represents a flame propagation range just after a relatively short time has elapsed from ignition, and a hypothetical sphere IS having a relatively large radius r represents a flame propagation range just after a relatively long time has elapsed from the ignition.

As the radius r is gradually increased, an interference part of the hypothetical sphere IS with the combustion chamber-defining inner wall becomes larger. In this embodiment, a volume of a non-interference part of the hypothetical sphere IS which is free of interference with the combustion chamber-defining inner wall when the piston 30 is at the top dead center position, will be referred to as "volume V2" for which a unit of cubic meters ($mm^3$) is also used. Further, an area of an interference surface between the hypothetical sphere IS and the combustion chamber-defining inner wall in the state when the piston 30 is at the top dead center position, will be referred to as "interference are S" for which a unit of square meters ($mm^2$) is used.

Figure 3:
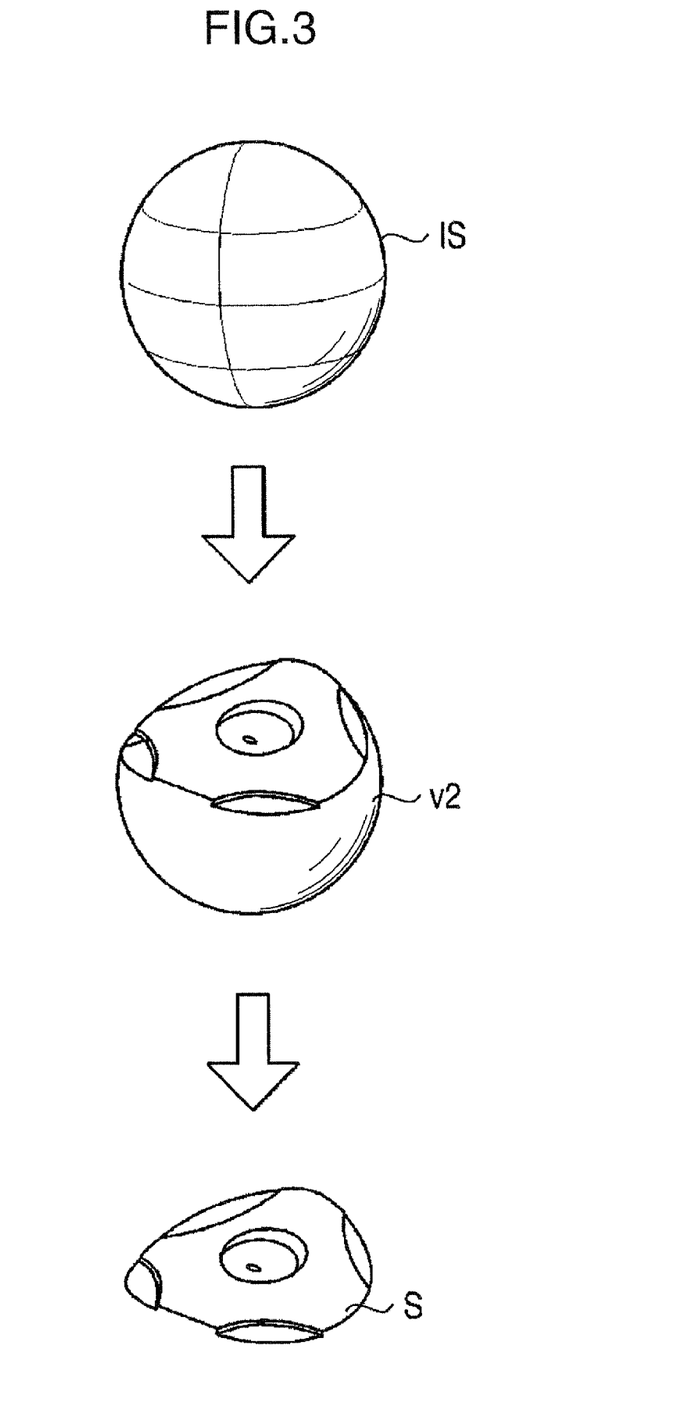
FIG. 3 is an explanatory diagram of a volume V2 and an interference area S.

FIG. 3 is an explanatory diagram of the volume V2 and the interference area S. FIG. 3 schematically shows the hypothetical sphere IS, the volume V2 and the interference area S, under a condition that the radius r is set at a certain value in such a manner as to allow the hypothetical sphere IS to come into interference with the cylinder head 10, the intake valves 1, the exhaust valves 2 and the spark plug 3, without interference with the piston 30. The volume V2 is a volume of a three-dimensional space obtained by removing an interference part of the hypothetical sphere IS with the combustion chamber-defining inner wall, from the hypothetical sphere IS, and the interference area S is an area of the interference part.

Then, in this embodiment, a relationship between respective ones of the radius r, the volume V2 and the interference area S is used as an evaluation index of improvement in fuel economy, and a configuration of the combustion chamber 4 is designed to satisfy a condition of $S/V2 \leq 0.12$ ($mm^{-1}$) when the radius r is set to satisfy a condition of $V2=0.15 \times V1$, so as to improve fuel economy. The reason for this conclusion is based on the following test result.

Figure 4A:
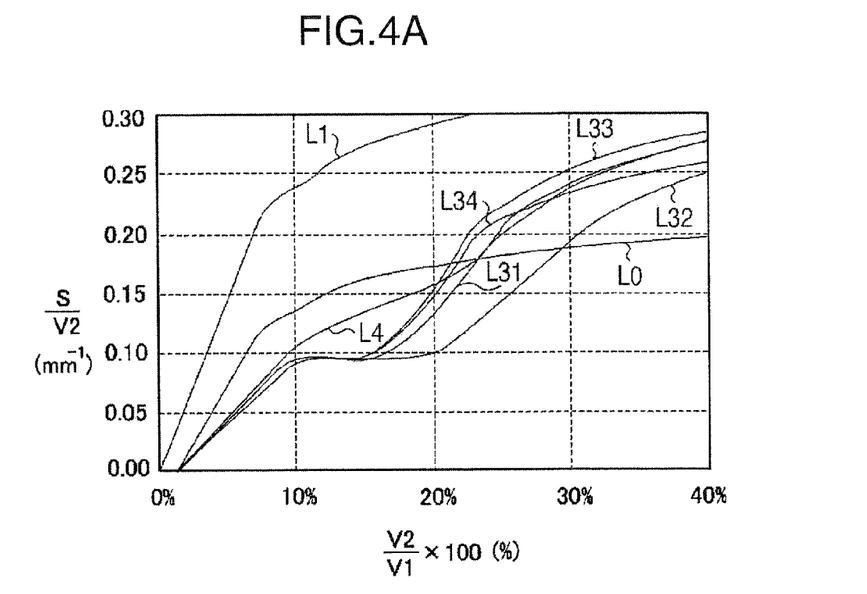
FIG. 4A is a graph showing a relationship between the volume V2/ a volume V1 and the interference area S/the volume V2, as a calculation result for a part of a plurality of pistons used in an experimental test.

In an experimental test, a plurality of types of pistons different in configuration were prepared, and each of the pistons was attached to a reciprocating engine having a bore of 87.5 mm and a stroke of 83.1 mm, in an exchanged manner, to measure fuel consumption under the same conditions. FIG. 4A is a graph showing a relationship between the volume V2/the volume V1 and the interference area S/the volume V2, as a calculation result for a part of the pistons used in the test, wherein the radius r of the hypothetical sphere IS was set at a plurality of values.

A value of the volume V2/the volume V1 has relevance to the radius r. A relatively small value of the volume V2/the volume V1 is indicative of an early stage of flame propagation, and a relatively large value of the volume V2/the volume V1 is indicative of a later stage of flame propagation. The volume V2 hypothetically corresponds to a flame propagation range. Thus, a value of the interference area S/the volume V2 is a ratio of an interference area to a volume of a flame propagation range set at a certain value.

Figure 5A:
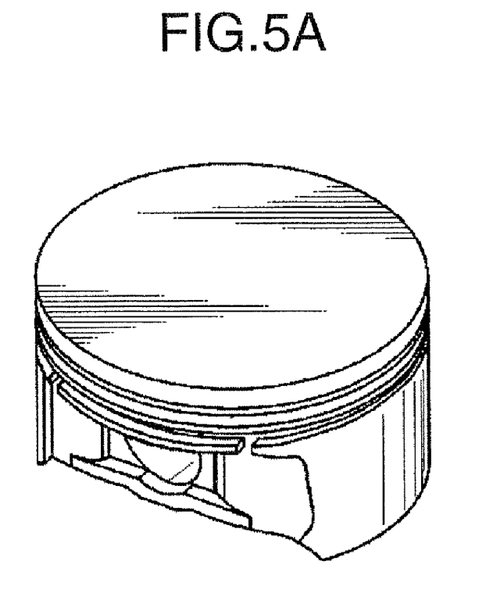
FIGS. 5A and 5B are fragmentary perspective views showing two types of pistons used in an experimental test.

A line L0 in FIG. 4A is a calculation result for a piston having an approximately flat top surface as shown in FIG. 5A, wherein the geometric compression ratio is 11.2. A line L1 is a calculation result for a piston having an approximately flat top surface as shown in FIG. 5A, wherein the geometric compression ratio is 15.0. In the case of the line L1, it can be considered that an interference between a flame and the combustion chamber-defining inner wall starts in an earlier stage of flame propagation as compared with the line L0.

Lines L31 to L34 are calculation results for a plurality of pistons having a bowl-shaped cavity formed on a top surface thereof as shown in FIG. 1B, wherein a size of the cavity and a configuration of the top surface other than the cavity were variously changed, and the geometric compression ratio is in the range of 14.0 to 15.0. When these pistons are used, a level of interference between a flame and the combustion chamber-defining inner wall along with flame propagation is lowered, as compared with the piston corresponding to the line L1. Further, based on providing the cavity, the interference area S/the volume V2 becomes a relatively small value when the volume V2/the volume V1 is within the range of 10 to 20%.

Figure 5B:
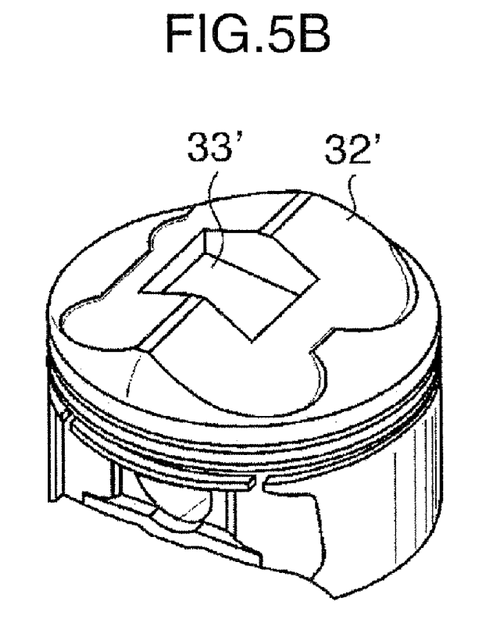

A line L4 is a calculation result for a piston having a raised portion 32' and a rectangular-shaped cavity 33' formed on a top surface thereof as shown in FIG. 5B, wherein the geometric compression ratio is in the range of 14.0 to 15.0. In this case, a level of interference between a flame and the combustion chamber-defining inner wall along with flame propagation is lowered, as compared with the piston corresponding to the line L1. However, an effect of the cavity on a value of the interference area S/the volume V2 is small as compared with the pistons corresponding to the lines L31 to L34. This means that an interference between a flame and the combustion chamber-defining inner wall occurs at an earlier timing than the pistons corresponding to the lines L31 to L34.

A measurement result on fuel consumption will be described below. As mentioned above, the measurement of fuel consumption was performed while attaching the plurality of types of pistons used in the test, to the engine in an exchanged manner under the same test conditions. Then, based on obtained measurement result, a fuel-economy improvement rate was graphically represented in relation to the interference area S/the volume V2, with respect to each of a plurality of different values of the volume V2/the volume V1. The fuel-economy improvement rate was calculated on a basis of a fuel consumption of the engine using one of the pistons (base model). When the geometric compression ratio is different from that of the base model, the fuel-economy improvement rate was corrected depending on a difference in geometric compression ratio in such a manner as to be converted to a fuel-economy improvement rate (estimate value) in the same geometric compression ratio as that of the base model.

Figure 4B:
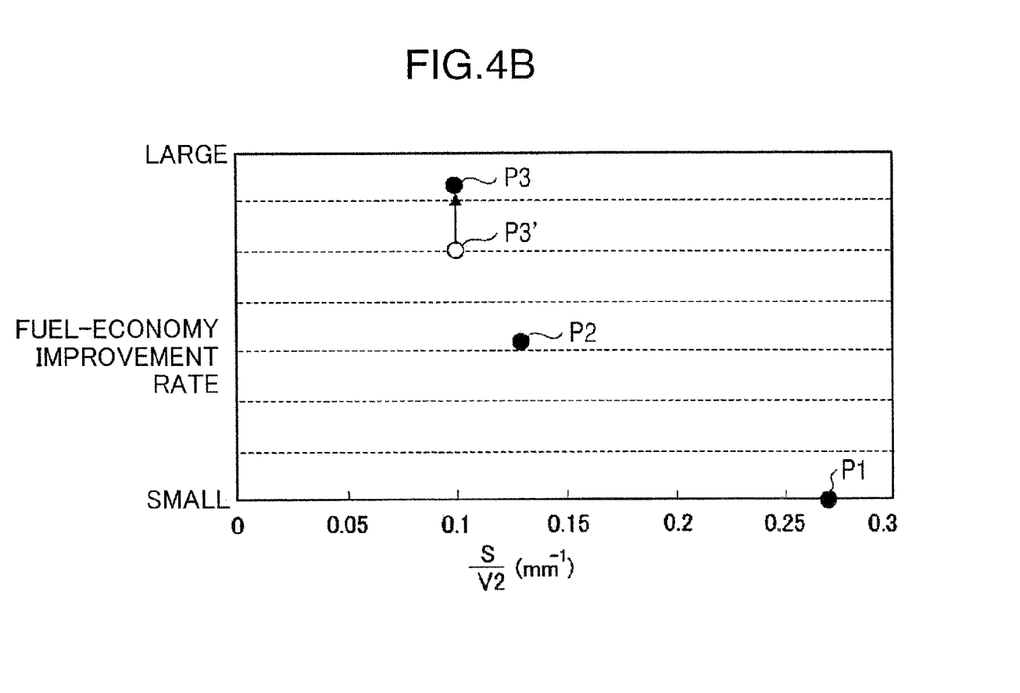
FIG. 4B is a graph showing a part of data on a measured fuel-economy improvement rate graphically expressed in relation to the interference area S/the volume V2.

FIG. 4B is a graph showing a part of data on the measured fuel-economy improvement rate graphically expressed in relation to the interference area S/the volume V2, wherein the volume V2/the volume V1 is set at a certain value.

Each of a point P1 and a pint P2 shows a fuel-economy improvement rate for a piston providing the same geometric compression ratio as that of the base model. A point P3 was obtained using a piston providing a geometric compression ratio different from that of the base model. That is, the point 3 was obtained by correcting a point P3' which is an actually measured fuel-economy improvement rate.

Figure 6:
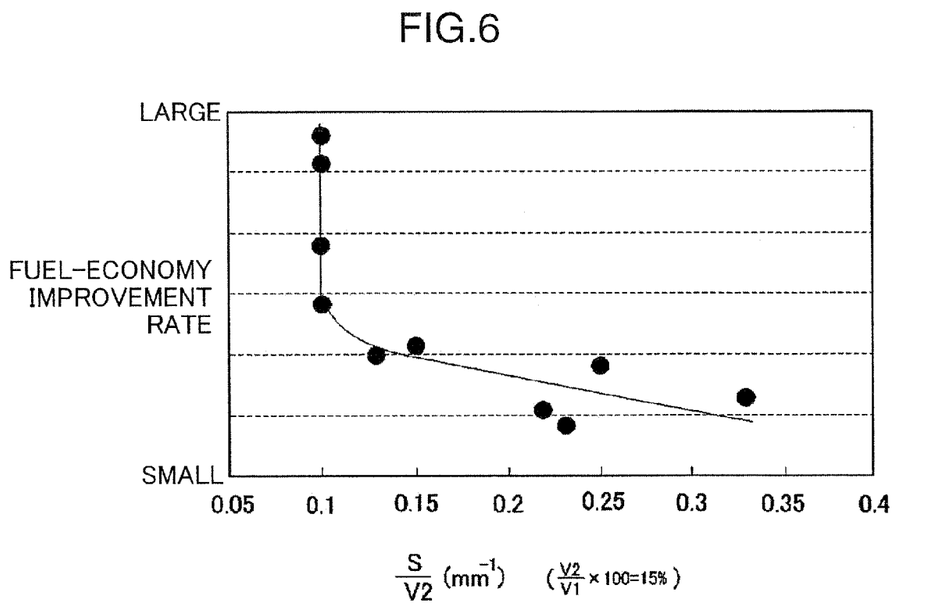
FIG. 6 is a graph showing a relationship between a fuel-economy improvement rate, and the interference area S/the volume V2, under a condition that a value of the volume V2/the volume V1 is 15%.

The data representing the relationship between the fuel-economy improvement rate and the interference area S/the volume V2 as shown in FIG. 4B was analyzed at a plurality of points falling within the range of the volume V2/the volume V1 of 0 to 40%. As a result, a correlative relationship between the fuel-economy improvement rate and the interference area S/the volume V2 was confirmed only under a condition that a value of the volume V2/the volume V1 is 15%. FIG. 6 is a graph showing a relationship between the fuel-economy improvement rate, and the interference area S/the volume V2, under the condition that a value of the volume V2/the volume V1 is 15%.

As seen in FIG. 6, after a value of the interference area S/the volume V2 becomes less than about 0.12 $(mm^{-1})$, the fuel-economy improvement rate is sharply increased. This tendency becomes prominent when the interference area S/the volume V2 is equal to or less than 0.10 $(mm^{-1})$. Thus, fuel economy can be more reliably improved by designing a configuration of the combustion chamber 4 to satisfy the condition of $S/V2 \leq 0.12$ $(mm^{-1})$, particularly $S/V2 \leq 0.10$ $(mm^{-1})$, when the radius r is set to satisfy the condition of $V2 = 0.15 \times V1$.

The correlative relation as shown in FIG. 6 was obtaining by carrying out the test under a condition that the geometric compression ratio is in the range of 14.0 to 15.0. Thus, it can be said that it is effective for improvement in fuel economy to design a configuration of a combustion chamber 4 in a high-compression engine having a geometric compression ratio of 14.0 or greater, or 14.5 or greater, to satisfy the condition of $S/V2 \leq 0.12$ $(mm^{-1})$. Although the above correlative relationship can exist in an engine having a geometric compression ratio of less than 14.0 because a volume of a combustion chamber is relatively increased along with a decrease in the geometric compression ratio, to improve flame propagation, the geometric compression ratio should be set at 13.0 or greater, in view of balance with improvement in thermal efficiency based on an increase in compression ratio.

A high geometric compression ratio is likely to cause a risk of abnormal combustion. However, in an engine provided with a fuel injector 5 for injecting fuel directly into a combustion chamber 4, as in this embodiment, an internal temperature of the combustion chamber 4 is lowered by latent heat of vaporization of fuel. This makes it possible to prevent occurrence of abnormal combustion, such as knocking, and improve fuel economy while stabilizing a combustion state, even in an engine having a high geometric compression ratio.

A method for reducing the interference area S when a value of the volume V2/the volume V1 is 15% includes configuring the piston 30 to be free of interference with the flame. More specifically, the piston 30 may be configured in such a manner that the hypothetical sphere IS is free of interference with the top surface 31 of the piston 30, when the radius r is set to satisfy the condition of $V2 = 0.15 \times V1$. This makes it possible to promote a flame propagation directed downwardly in the Z direction which is the movement direction of the piston 30 to improve engine thermal efficiency. Alternatively, a reduction of the interference area S may be achieved by appropriately adjusting a configuration of the cavity 33 of the piston 30.

Figure 7:
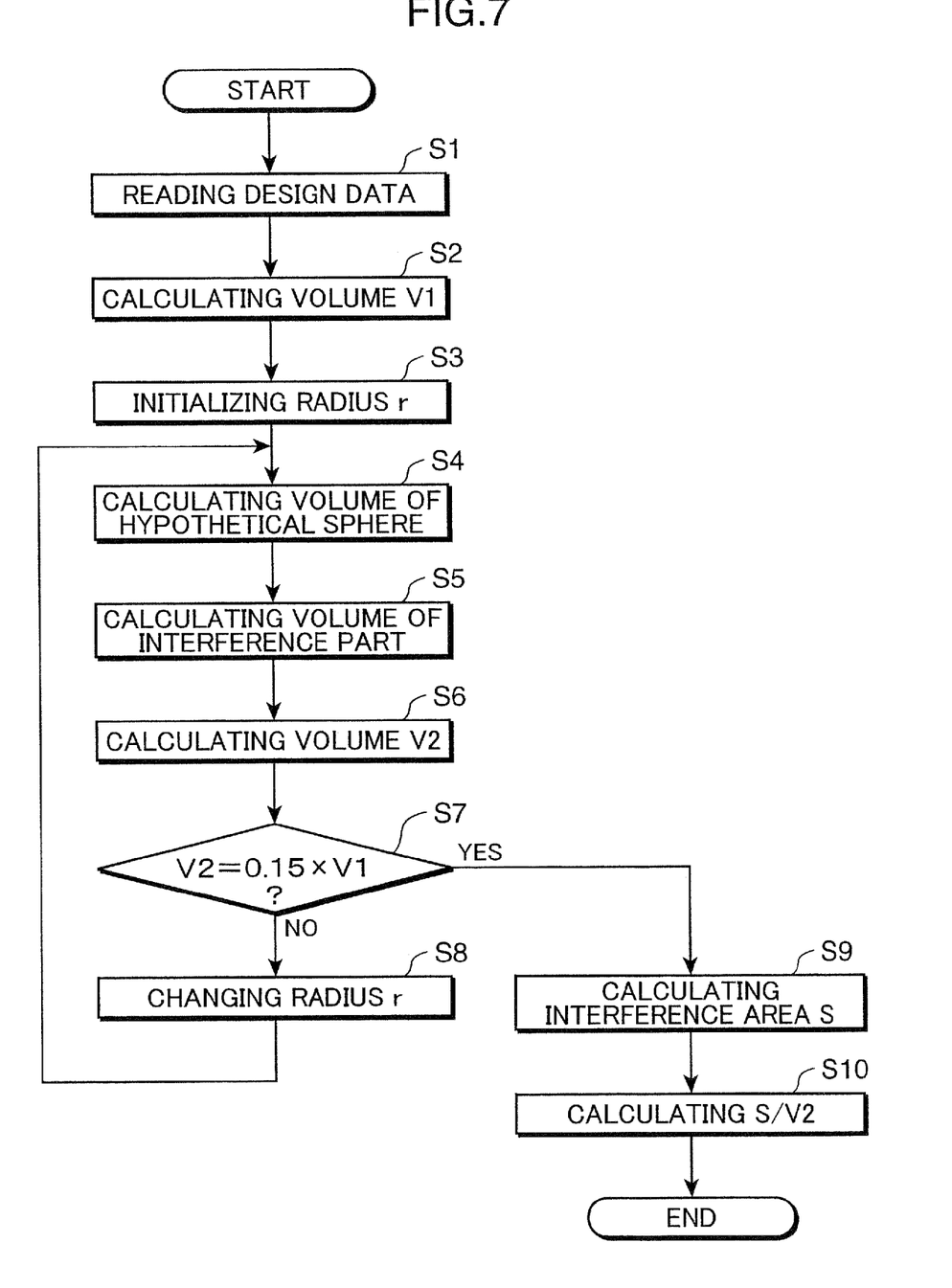
FIG. 7 is a flowchart showing one example of a processing to be executed by a computer, wherein a relationship between respective ones of a radius r, the volume V2 and the interference area S is used as an evaluation index of improvement in fuel economy.

One example of a process of designing an engine using the relationship between respective ones of the radius r, the volume V2 and the interference area S, as an evaluation index of improvement in fuel economy, will be described below. FIG. 7 is a flowchart showing one example of a processing to be executed by a computer, wherein the relationship between respective ones of the radius r, the volume V2 and the interference area S is used as the evaluation index of improvement in fuel economy.

In Step S1, design data about engine components defining the combustion chamber 4 is read. For example, each of the components is defined by a three-dimensional solid model. In Step S2, the volume V1 is calculated based on the design data read in Step S1. In Step S3, the radius r of the hypothetical sphere IS is set to an initial value. The initial value may be determined on a program in advance, or may be set by a user. In Step S4, a volume of the hypothetical sphere IS is calculated based on the radius r set in Step S3. In Step S5, an interference part of the hypothetical sphere IS with the components defining the combustion chamber 4 is figured out, and a volume of the interference part is calculated.

In Step S6, the volume V2 is calculated by subtracting the volume of the interference part calculated in Step S5 from the volume of the hypothetical sphere IS calculated in Step S4. In Step S7, it is determined whether the volume V2 calculated in Step S6 is 15% of the volume V1 calculated in Step S2. If YES, the routine advances to Step S9. If NO, the routine advances to Step S8. In Step S8, the value of the radius r is changed, and the routine returns to Step S4. Then, Steps S4 to S8 will be repeated until the volume V2 becomes equal to 15% of the volume V1, in Step S7. The change of the radius r in Step S8 may be configured to increment or decrement the radius r by a predetermined value.

In Step S9, the interference area S in a state when the volume V2 becomes equal to 15% of the volume V1 is calculated. In Step S10, S/V2 is calculated, and an obtained calculation result is output. Based on the calculation result, an engineer (user) can determine whether specifications of the components should be changed or fixed. For example, if a value of S/V2 in the calculated result is greater than 0.12 (mm$^{-1}$), the engineer will decide to redesign one or more of the components. While any of the components defining the combustion chamber 4 may be selected as a target for the redesign, it would be convenient to select the piston 30 in view of flexibility in design.

Based on performing the above processing on a computer, a certain level of presumption of improvement in fuel economy can be made without repeating a process of preparation of trial model→actual test→redesign, to effectively perform design activities.

The features and advantages of the present invention disclosed based on the above embodiment will be described by way of conclusion.

An internal combustion engine of the present invention comprises a cylinder, a piston which reciprocates within the cylinder;

a cylinder head which defines a combustion chamber in cooperation with the cylinder and piston, and a spark plug which is provided in the cylinder head, wherein the engine has a geometric compression ratio of 13.0 or greater, and the combustion chamber is configured to satisfy a condition of S/V2≦0.12 (mm$^{-1}$) when a radius r of a hypothetical sphere IS with its center at an ignition point of the spark plug is set to satisfy a condition of V2=0.15×V1, where: S (mm$^2$) is an area of an interference surface between the hypothetical sphere IS and an inner wall of the combustion chamber in a state when the piston is at its top dead center position; V1 (mm$^3$) is a volume of the combustion chamber in the state when the piston is at the top dead center position; and V2 (mm$^3$) is a volume of a non-interference part of the hypothetical sphere IS which is free of interference with the inner wall of the combustion chamber when the piston is at the top dead center position.

In the internal combustion engine of the present invention, the relationship between respective ones of the radius r, the volume V2 and the interference area S is used as an evaluation index of improvement in fuel economy, and the combustion chamber is configured to satisfy the above conditions. This makes it possible to more reliably improve fuel economy.

Preferably, in the internal combustion engine of the present invention, the piston is configured in such a manner that the hypothetical sphere is free of interference with the piston when the radius r is set to satisfy the condition of V2=0.15×V1. This makes it possible to promote a flame propagation in a downward direction corresponding to a movement direction of the piston to improve engine thermal efficiency.

In this case, the piston has preferably a cavity formed on a top surface thereof. This makes it possible to improve flame propagation characteristics to facilitate improvement in engine thermal efficiency.

More preferably, the cavity is arranged under the ignition point of the spark plug. This makes it possible to further improve the flame propagation characteristics to facilitate improvement in engine thermal efficiency.

Preferably, the internal combustion engine of the present invention further comprises a fuel injector arranged to inject fuel directly into the combustion chamber. According to this feature, an air/fuel mixture in the combustion chamber is cooled by latent heat of vaporization of fuel directly injected into the cylinder. This makes it possible to prevent occurrence of abnormal combustion, such as knocking, and improve fuel economy while stabilizing a combustion state, even in the geometric compression ratio is set at a high value.

Preferably, in cases where the cylinder head is provided with an intake valve, the spark plug and an exhaust valve which are arranged in this order in a direction perpendicular to a central axis of the piston, the top surface of the piston has a raised portion which gradually protrudes upwardly from a lateral part of the piston located under each of the intake and exhaust valves towards a center of the piston. This makes it possible to improve the flame propagation characteristics to allow the geometric compression ratio to be set at a higher value.

In this case, each of the intake valve and the exhaust valve is preferably provided in a number of two per combustion chamber.

More preferably, in the internal combustion engine of the present invention, the combustion chamber is configured to satisfy a condition of S/V2≦0.10 (mm$^{-1}$) when the radius r is set to satisfy the condition of V2=0.15×V1. This makes it possible to further facilitate improvement in fuel economy.

Preferably, the internal combustion engine of the present invention has a geometric compression ratio of 14.0 or greater, or 14.5 or greater. Based on the increased geometric compression ratio, the fuel economy can be further improved.

This application is based on Japanese Patent application serial No. 2008-001622 filed in Japan Patent Office on Jan. 8, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An internal combustion engine comprising:
   a cylinder;
   a piston which reciprocates within said cylinder;
   a cylinder head which defines a combustion chamber in cooperation with said cylinder and piston; and
   a spark plug which is provided in said cylinder head, wherein:
   said engine has a geometric compression ratio of 13.0 or greater; and
   said combustion chamber is configured to satisfy a condition of $S/V2 \leq 0.12$ ($mm^{-1}$) when a radius r of a hypothetical sphere with its center at an ignition point of said spark plug is set to satisfy a condition of $V2=0.15 \times V1$, where:
   $S$ ($mm^2$) is an area of an interference surface between said hypothetical sphere and an inner wall of said combustion chamber in a state when said piston is at its top dead center position;
   $V1$ ($mm^3$) is a volume of said combustion chamber in the state when said piston is at the top dead center position; and
   $V2$ ($mm^3$) is a volume of a non-interference part of said hypothetical sphere which is free of interference with the inner wall of said combustion chamber when said piston is at the top dead center position.

2. The internal combustion engine of claim 1, wherein said piston is configured in such a manner that said hypothetical sphere is free of interference with said piston when said radius r is set to satisfy the condition of $V2=0.15 \times V1$.

3. The internal combustion engine of claim 2, wherein said piston has a cavity formed on a top surface thereof.

4. The internal combustion engine of claim 3, wherein:
   said cylinder head is provided with an intake valve, said spark plug and an exhaust valve which are arranged in this order in a direction perpendicular to a central axis of said piston; and
   the top surface of said piston has a raised portion which gradually protrudes upwardly from a lateral part of said piston located under each of said intake and exhaust valves towards a center of said piston.

5. The internal combustion engine of claim 4, wherein said cavity is arranged under the ignition point of said spark plug.

6. The internal combustion engine of claim 5, further comprising a fuel injector arranged to inject fuel directly into said combustion chamber.

7. The internal combustion engine of claim 6, wherein each of said intake valve and said exhaust valve is provided in a number of two per combustion chamber.

8. The internal combustion engine of claim 7, wherein said combustion chamber is configured to satisfy a condition of $S/V2 \leq 0.10$ ($mm^{-1}$) when said radius r is set to satisfy the condition of $V2=0.15 \times V1$.

9. The internal combustion engine of claim 7, which has a geometric compression ratio of 14.0 or greater.

10. The internal combustion engine of claim 7, which has a geometric compression ratio of 14.5 or greater.

11. The internal combustion engine of claim 3, wherein said cavity is arranged under the ignition point of said spark plug.

12. The internal combustion engine of claim 11, further comprising a fuel injector arranged to inject fuel directly into said combustion chamber.

13. The internal combustion engine of claim 1, wherein:
    said cylinder head is provided with an intake valve, said spark plug and an exhaust valve which are arranged in this order in a direction perpendicular to a central axis of said piston; and
    the top surface of said piston has a raised portion which gradually protrudes upwardly from a lateral part of said piston located under each of said intake and exhaust valves towards a center of said piston.

14. The internal combustion engine of claim 13, further comprising a fuel injector arranged to inject fuel directly into said combustion chamber.

15. The internal combustion engine of claim 1, wherein said combustion chamber is configured to satisfy a condition of $S/V2 \leq 0.10$ ($mm^{-1}$) when said radius r is set to satisfy the condition of $V2=0.15 \times V1$.

16. The internal combustion engine of claim 1, which has a geometric compression ratio of 14.0 or greater.

17. The internal combustion engine of claim 1, which has a geometric compression ratio of 14.5 or greater.

* * * * *